(12) United States Patent
Walterman et al.

(10) Patent No.: US 6,492,988 B1
(45) Date of Patent: Dec. 10, 2002

(54) HYPER-DIMENSIONAL DATASCOPE

(75) Inventors: Michael T. Walterman, Framingham, MA (US); William S. Yerazunis, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/558,968

(22) Filed: Apr. 25, 2000

(51) Int. Cl.[7] .............................................. G06T 15/00
(52) U.S. Cl. ...................................................... 345/424
(58) Field of Search ................................ 345/419, 424, 345/426, 589, 591, 600

(56) References Cited

U.S. PATENT DOCUMENTS 4,945,478 A * 7/1990 Merickel et al. ............ 382/131
5,949,424 A * 9/1999 Cabral ........................ 345/426

* cited by examiner

*Primary Examiner*—Phu K. Nguyen
(74) *Attorney, Agent, or Firm*—Dirk Brinkman

(57) ABSTRACT

A signal analyzing and display system includes an input interface for continuously acquiring signals in parallel. A first triggering component samples signals according to predetermined time intervals. A second triggering component samples the input signals according to values of the input signals. A memory stores a reparameterization network. The reparameterization network is arranged to arbitrarily reparameterize the sampled input signals to vowels having RGBα values and x,y,z coordinates. A third triggering component samples the vowels, and stores the sampled vowels in a display memory. Then, a rendering engine can render the stored vowels on a display device. In addition, the system can include a controller for controlling the acquiring and reparameterizing of the input signals.

16 Claims, 3 Drawing Sheets

HYPER-DIMENSIONAL DATASCOPE

FIELD OF THE INVENTION

This invention relates generally to datascopes, and more particularly, to datascopes that display multiple signals in multiple dimensions.

BACKGROUND OF THE INVENTION

In a conventional analog real-time oscilloscope, a trigger circuit detects a trigger event of an input signal and enables a display device such as a cathode-ray tube (CRT) to display a waveform of the signal during a sweep interval that follows the trigger event. In other words, the oscilloscope displays the evolving signal over time. Some specialized oscilloscopes may have more than two input channels. However, the display is always restricted to two degrees of freedom, where one dimension is almost always time, and the other voltage.

Some oscilloscopes have an X-Y mode. In this mode, a first input signal is plotted against a second signal. However, such oscilloscopes do not provide for a way to plot signals in higher dimensions, or to reparameterize any of the input data. It is desired to provide a datascope that can deal with a larger number of input signals, and to display those signals in a higher dimension than two. Furthermore, it is desired that one of the dimensions is not necessarily time.

SUMMARY OF THE INVENTION

The invention provides a signal analyzing and display system including an input interface for continuously acquiring signals in parallel. A first triggering component samples signals according to predetermined time intervals. A second triggering component samples the input signals according to values of the input signals. A memory stores a reparameterization network.

The reparameterization network is arranged to arbitrarily reparameterize the sampled input signals to vowels having RGBα values and x,y,z coordinates. A third triggering component samples the vowels, and stores the sampled vowels in a display memory. Then, a rendering engine can render the stored vowels on a display device. In addition, the system can include a controller for controlling the acquiring and reparameterizing of the input signals. A blending function β can also be included with each voxel. If there is a blending function, then a new voxel value does not overwrite a previously stored value. Instead, the new and old value are blended according to the function β. The function can store the maximum, minimum, or average value of the old and new voxel values, or other derived values. The system can also display a time sequence of volumes, that is, different volume views, over a time interval.

DETAILED DESCRIPTION OF THE PREFERRED EMBODIMENT

Datascope Structure

Figure 1:
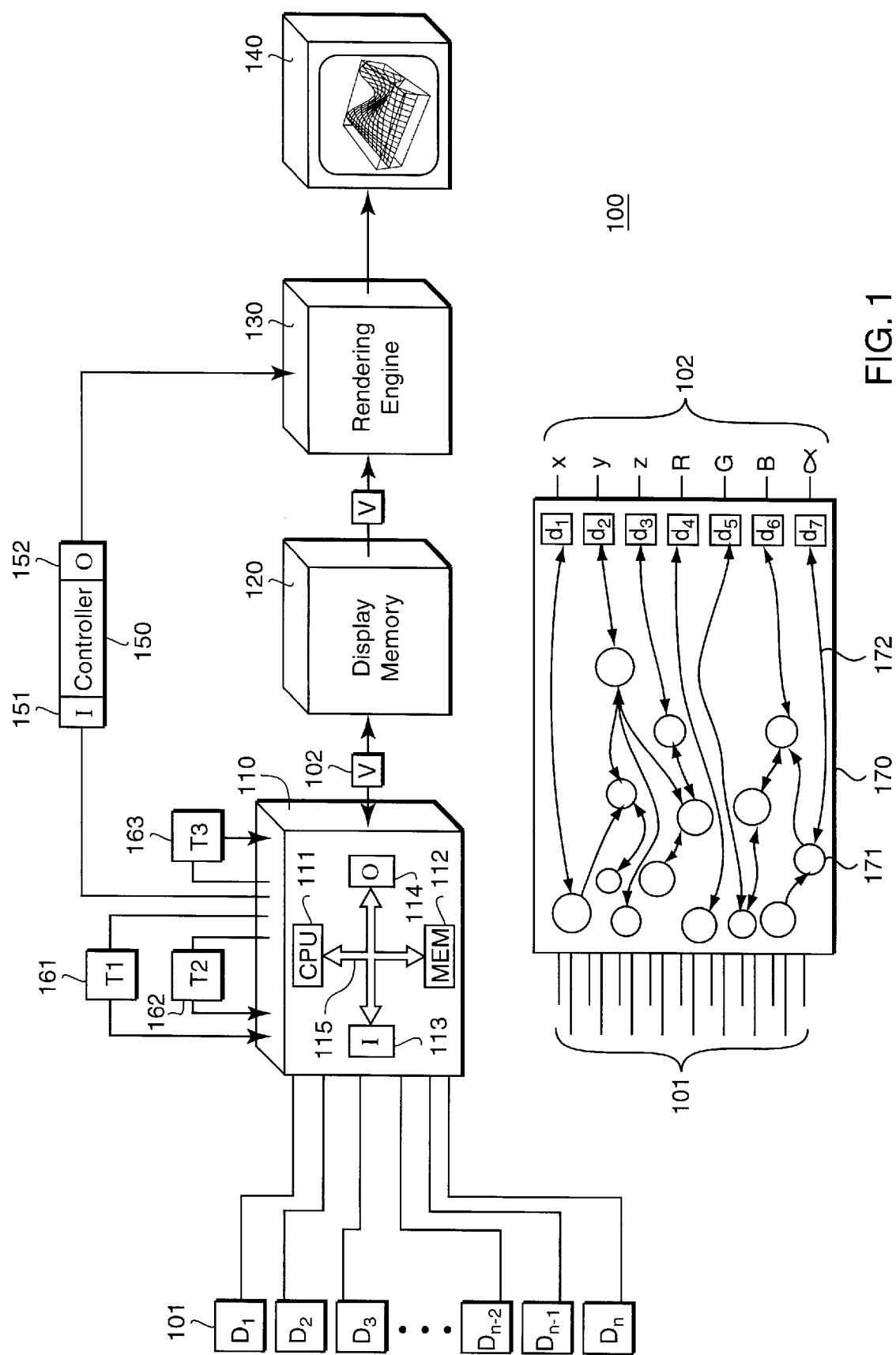
FIG. 1 is a block diagram of a hyper-dimensional datascope according to the invention.

FIG. 1 shows a hyper-dimensional datascope 100 according to the invention. The datascope includes a processor 110, a display memory 120, a rendering engine 130, and a display device 140 connected in series. The system also includes a controller 150.

The processor 110 includes a CPU 111, a memory 112, an input interface 113, and an output interface 114 connected to each other by a bus 115. The CPU executes instructions for software programs stored in the memory. The instructions operate on data, also stored in the memory. The software programs include operating system programs and application programs. The programs can operate in real-time.

Input data ($D_1, \ldots, D_n$) 101 are acquired via the input interface. The input interface can include analog-to-digital converters in the case where the input data are derived from analog signals. The input signals can be acquired from a physical system or from a simulator, or combinations thereof. In other words, the input data can be real or virtual. As an advantage of this invention, the number of input signals can be larger than the seven output signals. Unlike prior art oscilloscopes, there can be any number of timing or synchronization ("sync") signals, or none at all. Output data 102 are presented to display memory via the output interface.

The processor also includes several triggering components ($T_1, T_2, T_3$) 161–163. The triggering components can be implemented as hardware circuits, or by interrupt driven software programs. Here, a first triggering component 161 samples the input data 101 according to predetermined timing intervals, e.g., synchronization pulses. A second triggering component samples the input data according to signal conditions that exist in real-time. This is described in greater detail below. A third triggering component causes a voxel 102 to be written to the display memory as describe below. It should be understood that the system can include more than three triggers, and sampling can be for a subset of input data.

The display memory is organized to store volume data sets. In a volume data set, the individual volume elements are called vowels (V). Therefore, the output data 102 includes x,y,z coordinates, and RGBα values, where α is the opacity value in the range from zero to one. Optional output data is a frame number n in the case where a time sequence of volumes is to be displayed. Typically volume data sets can include $256^3$ vowels or more, requiring 16 MB or more of storage. In a preferred embodiment, the display is voxel-based. However, the display can also be raster-based, or a stereographic display.

A blending function β can also be associated with each voxel. If there is a blending function, then a new voxel value does not overwrite a previously stored value. Instead, the new and old values are blended according to the function β. The function can store the maximum, minimum, or average value of the old and new voxel values, or other derived values.

The rendering engine renders the volume data set stored in the display memory on the display device. The rendering engine refreshes the display at a real-time rate, for example thirty or sixty frames per second. The refreshing causes the display to reflect a current state of the voxel data in the display memory. The rendering engine can be software based, e.g., AVS/Express from Advanced Visual Systems Inc., and VTK from Kitware, Inc., or hardware based, e.g., the pipelined VolumePro500 board from Mitsubishi Electronics America, Inc.

The controller 150 includes an input controller 151, and an output controller 152. The input controller determines how the input signals are acquired and reparameterized to the output data, and the output controller determines how the output data are rendered on the display device.

In addition to the instructions and data, the memory 112 also stores a reparameterization network 170. In the network, the nodes 171 represent reparameterization functions, and the directed edges 172 represented data paths between reparameterization functions. The network 170 reparameterizes the input data 101 to the output data 102. The functions can be implemented as software programs, or as hardware circuits, or combinations thereof. The essential function of the network 170 is to translate the arbitrary set of input signals ($D_1, \ldots, D_7$) into RGBα values and their x,y,z coordinates.

Specific values of data in the network or specified transitions in the values can enable the triggering components 161–163. Example functions include addition, multiplication, integration, logarithms, filtering, cross-correlation, thresholding, table-look-up, logical, and the like. In one embodiment, as shown, the network 170 is defined by a graphical user interface.

Unlike prior art rendering systems which are generally precoupled either in software or hardwire for a given set of inputs, the network according to the invention can be arbitrarily rearranged by the user to solve any number of signal analyzing problems. In addition, the network and functions can be arranged so that specified data values in the network enable any of the triggering components.

The reparameterization network 170 can be rearranged by a user via the controller 150, or automatically. The rearrangement can be in real-time.

Datascope Operation

Figure 2:
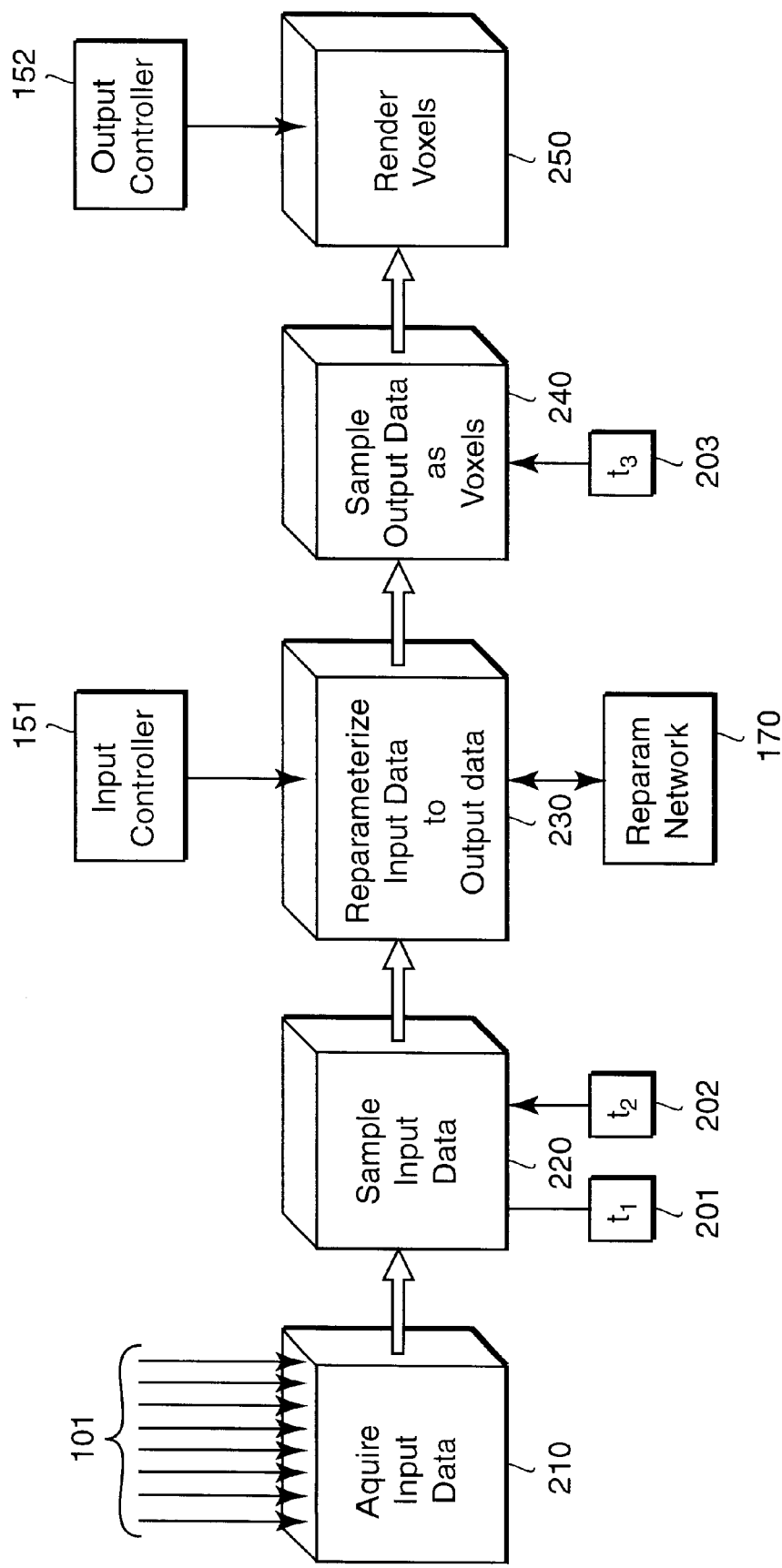
FIG. 2 is a flow diagram of the operation of the datascope of FIG. 1.

FIG. 2 shows a method 200 for operating the datascope according to the invention. In step 210, input signals 101 are continuously acquired. In step 220, samples of the input signals are taken in response to triggering events $t_1$ and $t_2$ 201–202 generated by the triggering components 161–162. Any analog input signals are converted to digital input signals.

Step 230 reparameterizes the sampled input signals according to the input controller 151 and the reparameterization network 170. In step 240, the reparameterized data are sampled according to triggering event $t_3$ generated by the triggering component 163, and the sampled output data are written to the display memory. Unlike traditional oscilloscopes and datascopes, it is not necessarily the case that output samples are evenly spaced in time. The invention allows sampling according to other significant events, for example voltage spikes or physiological conditions, e.g., heart beats. Step 250 renders the sampled output data onto the display device according to the output controller 152.

In the case where a voxel has an associated blending function β, the previously stored voxel values (V) 102 at a particular x,y,z coordinate are read from the display memory 120, and fed back into the reparameterization network 170. The previously stored values are blended with the new sample, according to the functions, before being written back to the display memory.

In the case where full motion volume images are rendered, the voxel has an associated frame or sequence number n, where n may be an additional output of the reparameterization network.

Applications For Datascope

The datacope as described above can be used in a number of signal acquisition and analyzing applications such as investigating linear to logarithmic responses in signals, e.g., dB, cross-correlating multiple input signals to an output signal, spherical to Cartesian conversion, analyzing raw signals to signal noise and error rates, and viewing time as a dependent rather than an independent variable.

More specifically, the datascope can measure and display the statistical location and motion of entire populations, from particles to people, the data traffic on an entire wide area network, or an entire state of a weather system. The datascope can also perform real-time data visualization in a laboratory environment, or any other application where the number of input channels needs to be unrestricted. The datascope is particularly suited for applications where there needs to be a free interchange of the axes used to display the data, including any measured variable, including time. The datascope can also display variables that are derived from the reparameterization network.

Figure 3:
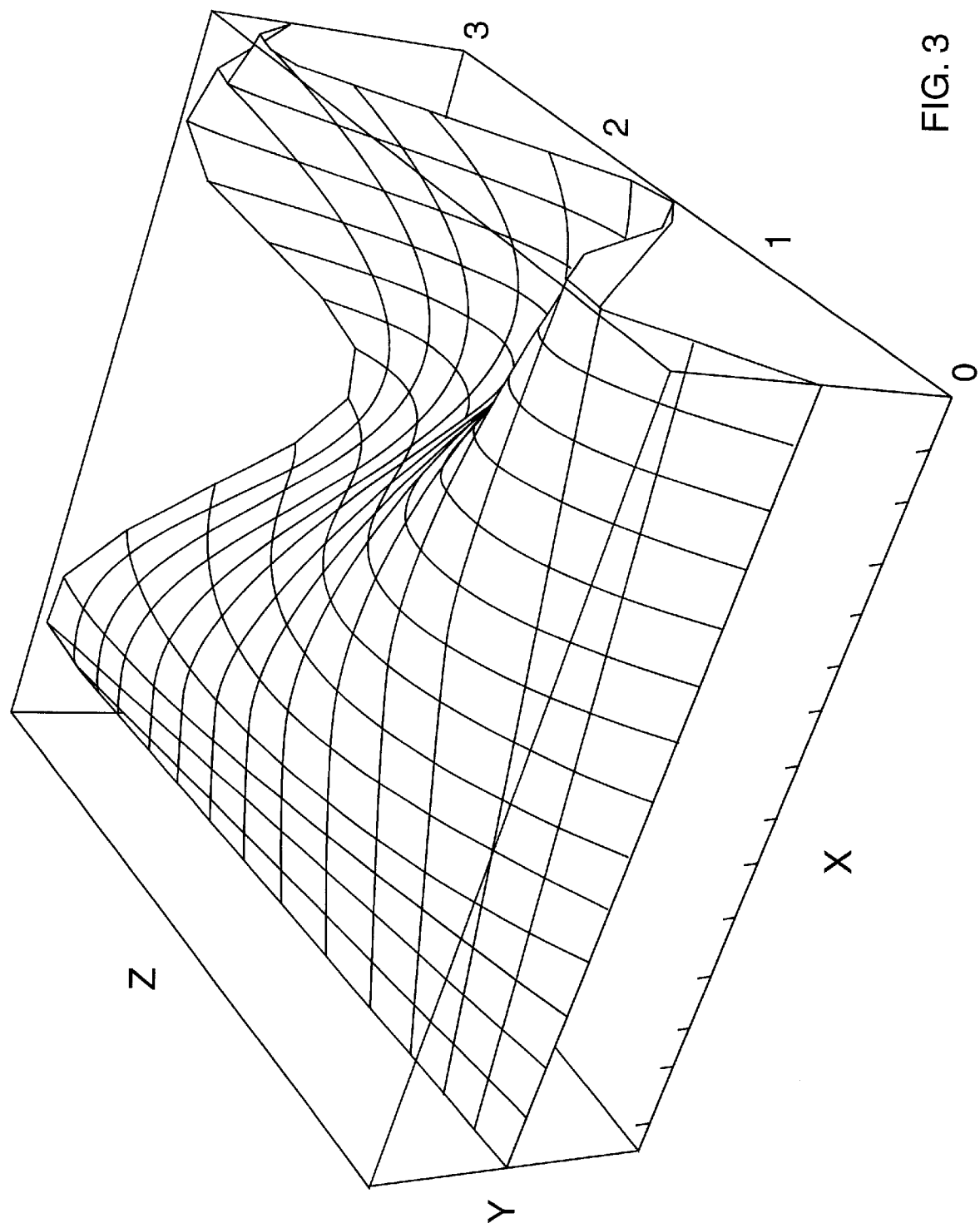
FIG. 3 is a three-dimensional graph produced by the system of FIG. 1.

FIG. 3 shows one possible graph 300. In FIG. 3, the x-axis measures events, the y-axis voltage, and the z-axis relative time with respect to the events. The colors of the graph, not shown, are relative to a particular display modality and configuration of the reparameterization network. For example, colors towards the red-part of the spectrum can indicate relatively high currents, and colors to the blue end can indicate relatively low currents.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

What is claimed is:

1. A signal analyzing and display apparatus, comprising:
   an input interface configured to continuously acquire a plurality of input signals in parallel;
   a first triggering component configured to sample the plurality of input signals according to predetermined time intervals;
   a memory for storing a reparameterization network, the reparameterization network arranged to arbitrarily reparameterize the sampled input signals to vowels having RGBα values and x,y,z coordinates;
   a second triggering component configured to sample the vowels, and to store the sampled vowels in a display memory; and
   a rendering engine to render the stored vowels on a display device.

2. The apparatus of claim 1 wherein the input signals include digital signals.

3. The apparatus of claim 1 wherein the input signals include analog signals.

4. The apparatus of claim 1 wherein the number of input signals is greater than seven.

5. The apparatus of claim 1 further including an input controller for controlling the acquiring and reparameterizing of the input signals.

6. The apparatus of claim 1 further including an output controller for controlling the rendering of the output data.

7. The apparatus of claim 1 wherein the reparameterization network includes function means connected by datapaths.

8. The apparatus of claim 1 wherein the input signals are acquired from a physical system.

9. The apparatus of claim 1 wherein the input signals are acquired from a simulator.

10. The apparatus of claim 1 wherein a subset of the input signals are sampled.

11. The apparatus of claim 1 wherein the reparameterization network is defined by a graphical user interface.

12. The apparatus of claim 1 further including a third triggering component configured to sample the plurality of input signals according to values of the plurality of input signals.

13. The apparatus of claim 1 wherein each voxel has an associated blending function β, the blending function combining a previously stored voxel with a newly sampled voxel.

14. The apparatus of claim 13 wherein the blending is performed by the reparameterization network.

15. The apparatus of claim 1 wherein each voxel has an associated frame number n to enable a full-motion rendering of the input signals.

16. A method for signal analyzing and displaying signals, comprising the steps of:

acquiring continuously a plurality of input signals in parallel;

generating a first triggering signal to sample the plurality of input signals according to predetermined time intervals;

generating a second triggering signal to sample the plurality of input signals according to values of the plurality of input signals;

storing a reparameterization network in a memory, the reparameterization network arranged to arbitrarily reparameterize the sampled input signals to vowels having RGBα values and x,y,x coordinates;

generating a third triggering signal to sample the vowels, and to store the sampled vowels in a display memory; and rendering the stored vowels on a display device.

* * * * *